(12) United States Patent
Kim

(10) Patent No.: US 11,055,763 B2
(45) Date of Patent: Jul. 6, 2021

(54) USER AUTHENTICATION IN HYBRID ONLINE AND REAL-WORLD ENVIRONMENTS

(71) Applicant: eBay Inc., San Jose, CA (US)

(72) Inventor: Phil Jae Kim, Seoul (KR)

(73) Assignee: eBay Inc., San Jose, CA (US)

( * ) Notice: Subject to any disclaimer, the term of this patent is extended or adjusted under 35 U.S.C. 154(b) by 241 days.

(21) Appl. No.: 15/945,147

(22) Filed: Apr. 4, 2018

(65) Prior Publication Data

US 2019/0311369 A1 Oct. 10, 2019

(51) Int. Cl.
| | |
|---|---|
| *G06Q 30/06* | (2012.01) |
| *H04L 29/06* | (2006.01) |
| *G06Q 30/02* | (2012.01) |
| *G06Q 20/40* | (2012.01) |
| *G06K 9/00* | (2006.01) |

(52) U.S. Cl.
CPC ..... *G06Q 30/0631* (2013.01); *G06Q 30/0251* (2013.01); *H04L 63/0861* (2013.01); *G06K 9/00288* (2013.01); *G06Q 20/40145* (2013.01)

(58) Field of Classification Search
CPC ..... G06Q 30/02; G06Q 30/0251–0277; G06Q 30/06; G06Q 30/0601–0643; G06Q 30/08; G06Q 30/0631; G06Q 30/0207; G06Q 30/0241; H04L 67/306; H04L 63/0861;

(Continued)

(56) References Cited

U.S. PATENT DOCUMENTS

| | | |
|---|---|---|
| 6,123,259 A | 9/2000 | Ogasawara |
| 9,064,277 B2 | 6/2015 | Wong et al. |

(Continued)

FOREIGN PATENT DOCUMENTS

| | | |
|---|---|---|
| EP | 1895462 A1 | 3/2008 |
| WO | 2019/194964 A1 | 10/2019 |
| WO | 2019/194973 A1 | 10/2019 |

OTHER PUBLICATIONS

Competing in an age of Omnichannel Retailing. Erik Brynjolfsson. Yu Jeffrey Hu. Mohammad Rahman. MIT Sloan Management Review. May 2013. (Year: 2013).*

(Continued)

*Primary Examiner* — William J Allen
(74) *Attorney, Agent, or Firm* — Schwegman Lundberg & Woessner, P.A.

(57) ABSTRACT

Methods, systems, and media for user authentication in hybrid online and real-world environments are disclosed. In one example, a method comprises providing a real-world environment including a display of physically retrievable items available for purchase, detecting the presence of a user device associated with a user in the real-world environment, and storing identity data received from the user device. Interest data for one of the physically retrievable items is identified based on sensed biometric data of the user and an online offering for a comparable online item is automatically implemented without manual operation of the user device. A user identification associated with an online account is derived based on the stored identity data received from the user device and the online offering for the item comparable to the physically retrievable item is provided to the online account associated with the user identification.

12 Claims, 7 Drawing Sheets

(58) Field of Classification Search
CPC .................... G06F 21/32; G06K 9/00221; G06K 9/00288; G06K 9/00302; G06K 9/003358
See application file for complete search history.

(56) References Cited

U.S. PATENT DOCUMENTS

| | | |
|---|---|---|
| 2003/0236710 A1 | 12/2003 | Tong et al. |
| 2008/0249867 A1* | 10/2008 | Angell .................. G06Q 30/02 705/14.26 |
| 2011/0282662 A1 | 11/2011 | Aonuma et al. |
| 2013/0046595 A1 | 2/2013 | Wu et al. |
| 2014/0278745 A1 | 9/2014 | Herring et al. |
| 2014/0363059 A1 | 12/2014 | Hurewitz |
| 2014/0365334 A1 | 12/2014 | Hurewitz |
| 2015/0058123 A1 | 2/2015 | Lenahan et al. |
| 2015/0112790 A1 | 4/2015 | Wolinsky et al. |
| 2015/0186979 A1 | 7/2015 | Bernath et al. |
| 2015/0243278 A1 | 8/2015 | Kibre et al. |
| 2016/0180404 A1* | 6/2016 | Stern .................. G06Q 30/0269 705/14.58 |
| 2016/0328765 A1 | 11/2016 | Pang et al. |
| 2016/0335714 A1 | 11/2016 | Geetha et al. |
| 2016/0379254 A1* | 12/2016 | Ray .................... G06Q 30/0255 705/14.45 |
| 2017/0255942 A1 | 9/2017 | Chandrasekaran et al. |
| 2018/0075515 A1* | 3/2018 | Yancey ............. G06Q 30/0631 |
| 2018/0108001 A1* | 4/2018 | Taylor .................. G06Q 20/206 |
| 2019/0147228 A1* | 5/2019 | Chaudhuri ......... G06K 9/00302 382/118 |
| 2019/0213659 A1* | 7/2019 | Shannon ............... G06F 40/274 |
| 2019/0311368 A1 | 10/2019 | Kim et al. |

OTHER PUBLICATIONS

International Search Report received for PCT Application No. PCT/US2019/022854, dated Jun. 5, 2019, 3 pages.
Written Opinion received for PCT Application No. PCT/US2019/022854, dated Jun. 5, 2019, 6 pages.
International Search Report received for PCT Application No. PCT/US2019/023069, dated Jul. 12, 2019, 3 pages.
Written Opinion received for PCT Application No. PCT/US2019/023069, dated Jul. 12, 2019, 8 pages.
Non Final Office Action Received for U.S. Appl. No. 15/945,128, dated Jul. 6, 2020, 37 pages.
Final Office Action received for U.S. Appl. No. 15/945,128, dated Dec. 17, 2020, 47 pages.
International Preliminary Report on Patentability received for PCT Application No. PCT/US2019/022854, dated Oct. 15, 2020, 8 pages.
International Preliminary Report on Patentability received for PCT Application No. PCT/US2019/023069, dated Oct. 15, 2020, 10 pages.
Advisory Action Received for U.S. Appl. No. 15/945,128, dated Mar. 9, 2021, 3 pages.

* cited by examiner

USER AUTHENTICATION IN HYBRID ONLINE AND REAL-WORLD ENVIRONMENTS

TECHNICAL FIELD

Embodiments of the present disclosure relate generally to user authentication, and more particularly to systems, methods and media for integrating aspects of user authentication in hybrid online and real-world environments.

BACKGROUND

User authentication in an online environment typically involves entry by a user of a user name and password, sometimes supplemented with dual-factor authentication or invoking a security question in the event of a password reset. In a real-world environment, personal credentials are usually conveyed in more physical manner, such as by presenting a driver's license or passport, for example. The respective methods are not always harmonious or convenient when a hybrid transaction includes both online and real-world operations.

While some electronic devices are now capable of accepting biometric data for user authentication, some degree of manual device manipulation may still be required. Moreover, the use of biometric data alone in seeking to facilitate transactions has limitations, particularly in hybrid online real-world situations.

The present disclosure seeks to address these and other technical problems, and aims to provide user authentication applications as technical solutions to these problems, as described more fully below.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
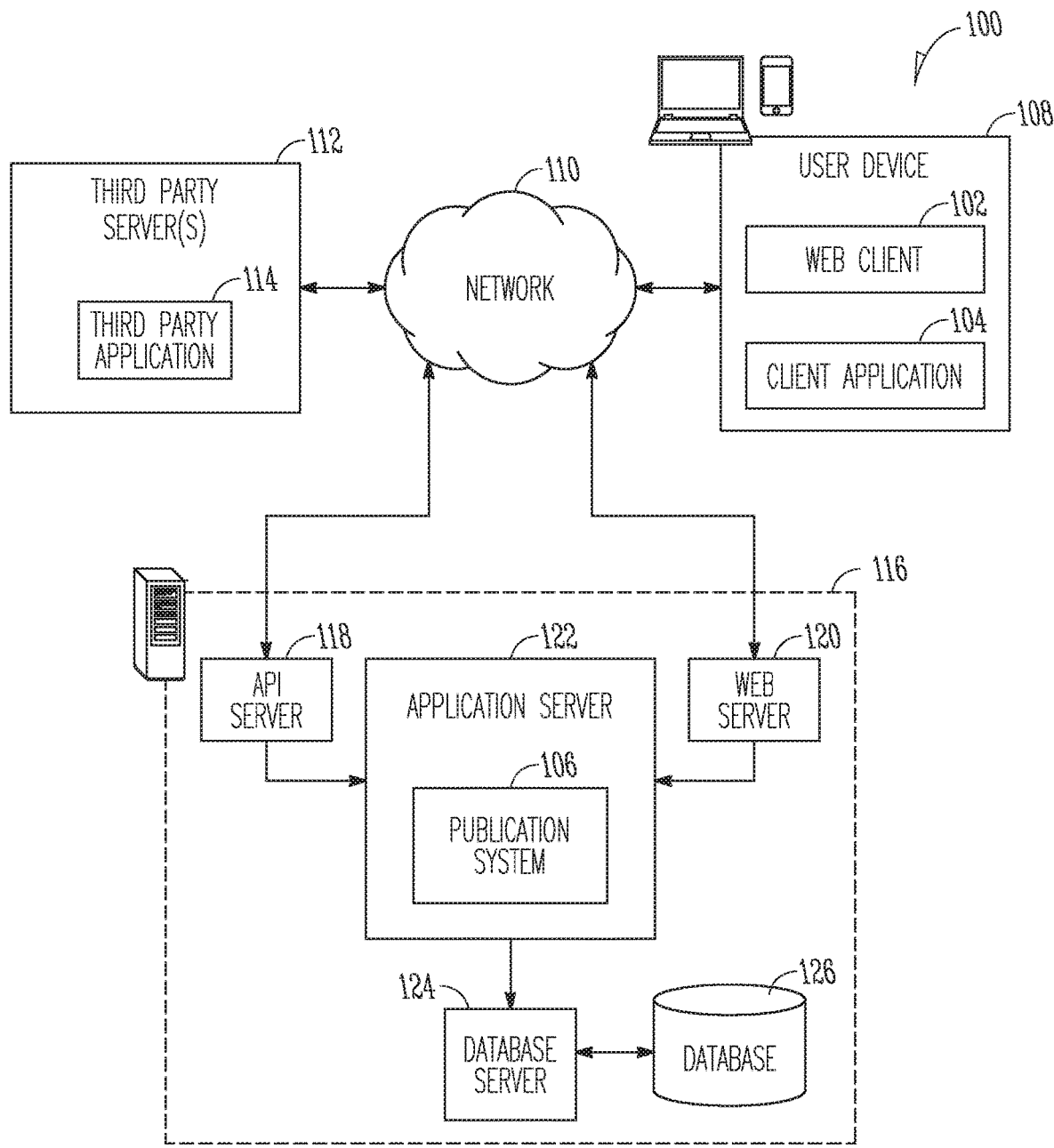
FIG. 1 is a block diagram illustrating a networked system, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail. The present disclosure provides technical solutions for user authentication in online and real-world applications, and for use in hybrid situations combining aspects of these two environments. Systems, methods, and architectures for deployment optimization are also disclosed herein.

"CARRIER SIGNAL", in this context, refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE", in this context, refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronics system, game console, set-top box, or any other communication device that a user may use to access a network.

"COMMUNICATIONS NETWORK", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT", in this context, refers to a device, a physical entity, or logic having boundaries defined by function, method, property, object or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM", in this context, refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR", in this context, refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by any one of the patent document or the patent disclosure, as it appears in the Patent and Trademark Office patent tiles or records, but otherwise reserves all copyright rights whatsoever. The following notice applies to the software and data as described below and in the drawings that form a part of this document: Copyright 2018, eBay Inc., All Rights Reserved.

With reference now to FIG. 1, an example embodiment of a high-level SaaS network architecture 100 is shown. A networked system 116 provides server-side functionality via a network 110 (e.g., the Internet or a WAN) to a client (or user) device 108. A web client 102 and a programmatic client, in the example form of an application 104, are hosted and execute on the client device 108. The networked system 116 includes an application server 122, which in turn hosts a publication system 106 that provides a number of functions and services to the application 104 that accesses the networked system 116. The application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An application program interface (API) server 118 and a web server 120 are coupled, and provide programmatic and web interfaces respectively, to the application server 122. The application server 122 is, in turn, shown to be coupled to a database server 124 that facilitates access to information storage repositories (e.g., a database 126). In an example embodiment, the database 126 includes storage devices that store information accessed and generated by the publication system 106. The database 126 may also store cloud-based or other data accessed or used by the application 104 executing on the client device 108, or a third-party application 114, executing on a third-party server(s) 112. The database 126 may be comprised of several remote or onsite databases, for example. Other configurations are possible.

The third-party application 114, executing on a third-party server(s) 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications 104 hosted by the client device 108, the web client 102 may access the various systems (e.g., publication system 106) via the web interface supported by the web server 120. Similarly, the application 104 (e.g., an "app") accesses the various services and functions provided by the publication system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present disclosure is not limited to such an architecture, and could equally well find application in a distributed, or peer-to-peer, architecture system, for example. The publication system 106 could also be implemented as a standalone software program, which does not necessarily have networking capabilities.

Figure 2:
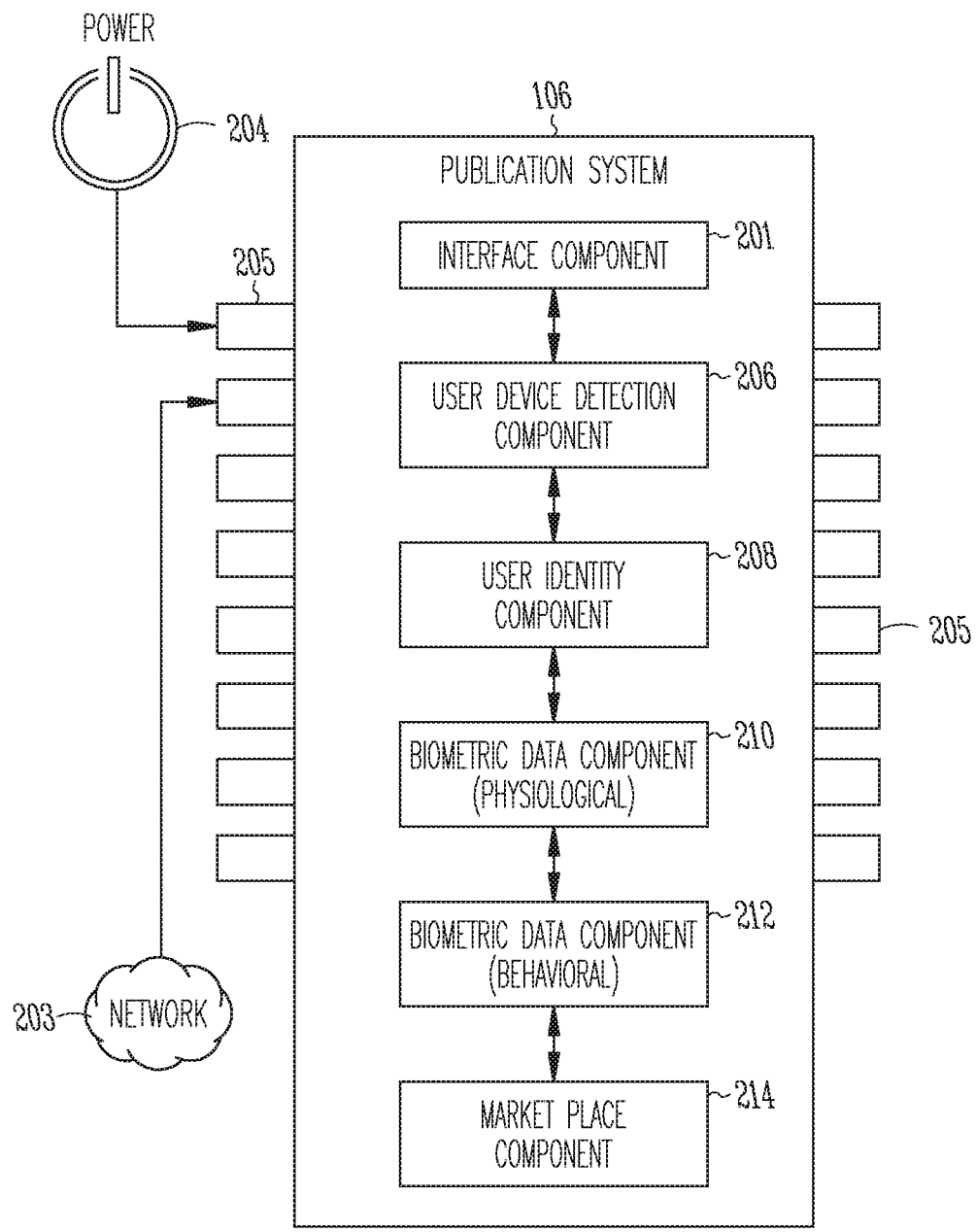
FIG. 2 is a block diagram showing architectural details of a publication system, according to an example embodiment.

FIG. 2 is a block diagram showing architectural details of the publication system 106, according to some example embodiments. This is not an abstract system or idea. A power supply is shown at 204, and the publication system 106 includes computer processors and components, described further below. Hardwired connection pins are shown diagrammatically at 205, for example. The publication system 106 is specially-configured and technically improved to implement the methods described herein.

More specifically, the publication system 106 is shown to include an interface component 201 by which the publication system 106 communicates (e.g., over a network 211) with other systems within the SaaS network architecture 100. The interface component 210 is collectively coupled to other specially configured components 206-214 to perform, in conjunction with each other, certain operations in accordance with the methods described further below with reference to the accompanying drawings.

Figure 3:
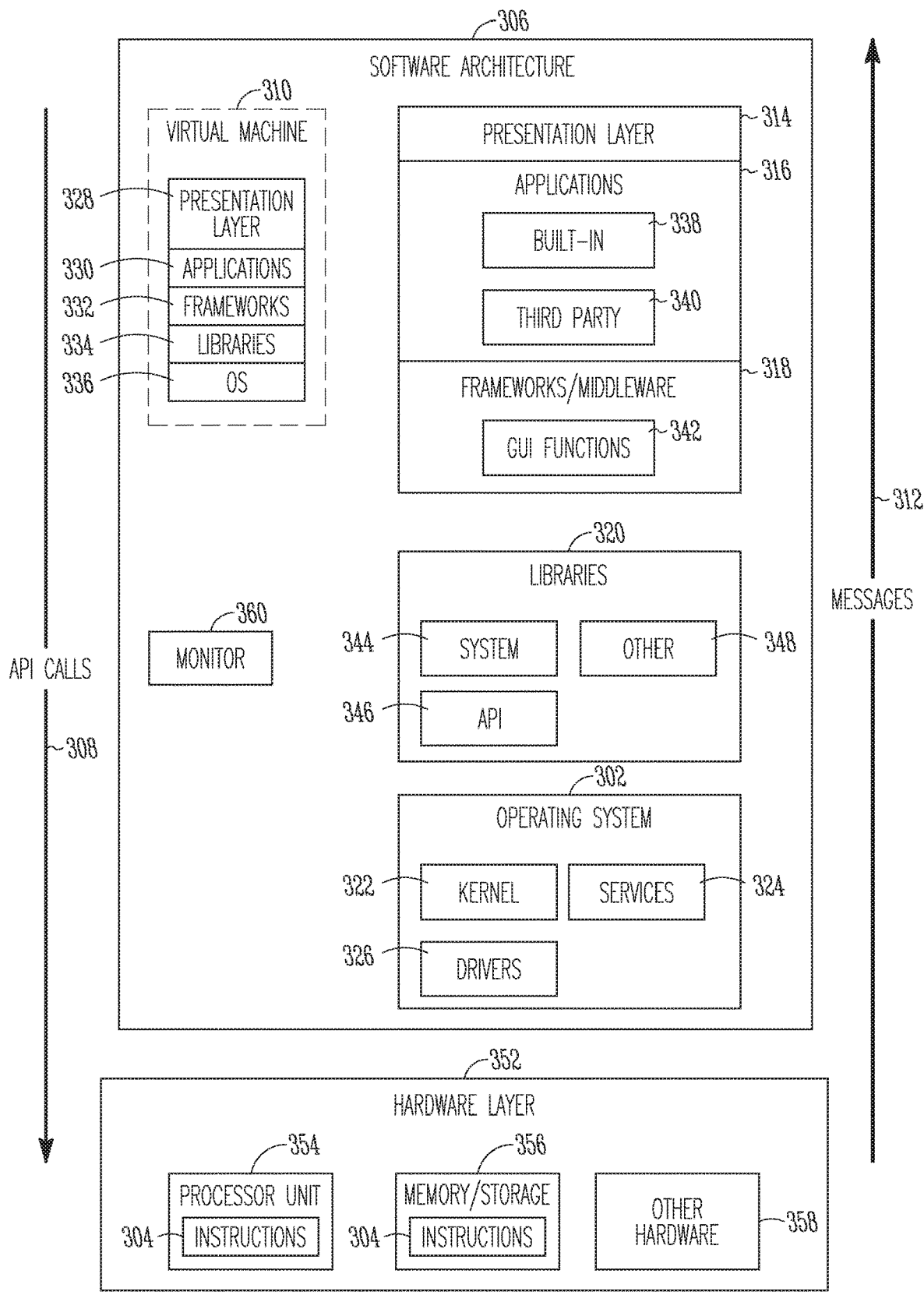
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent, for example, the machine 400 of FIG. 4. The representative hardware layer 352 includes a processing unit 354 having associated executable instructions 304. The executable instructions 304 represent the executable instructions 304 of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) calls 308 through the software stack and receive messages 312 in response to the API calls 308. The layers illustrated are representative in nature, and not all software architectures have all layers. For example, some mobile or special-purpose operating systems may not provide a. frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components or modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. in the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
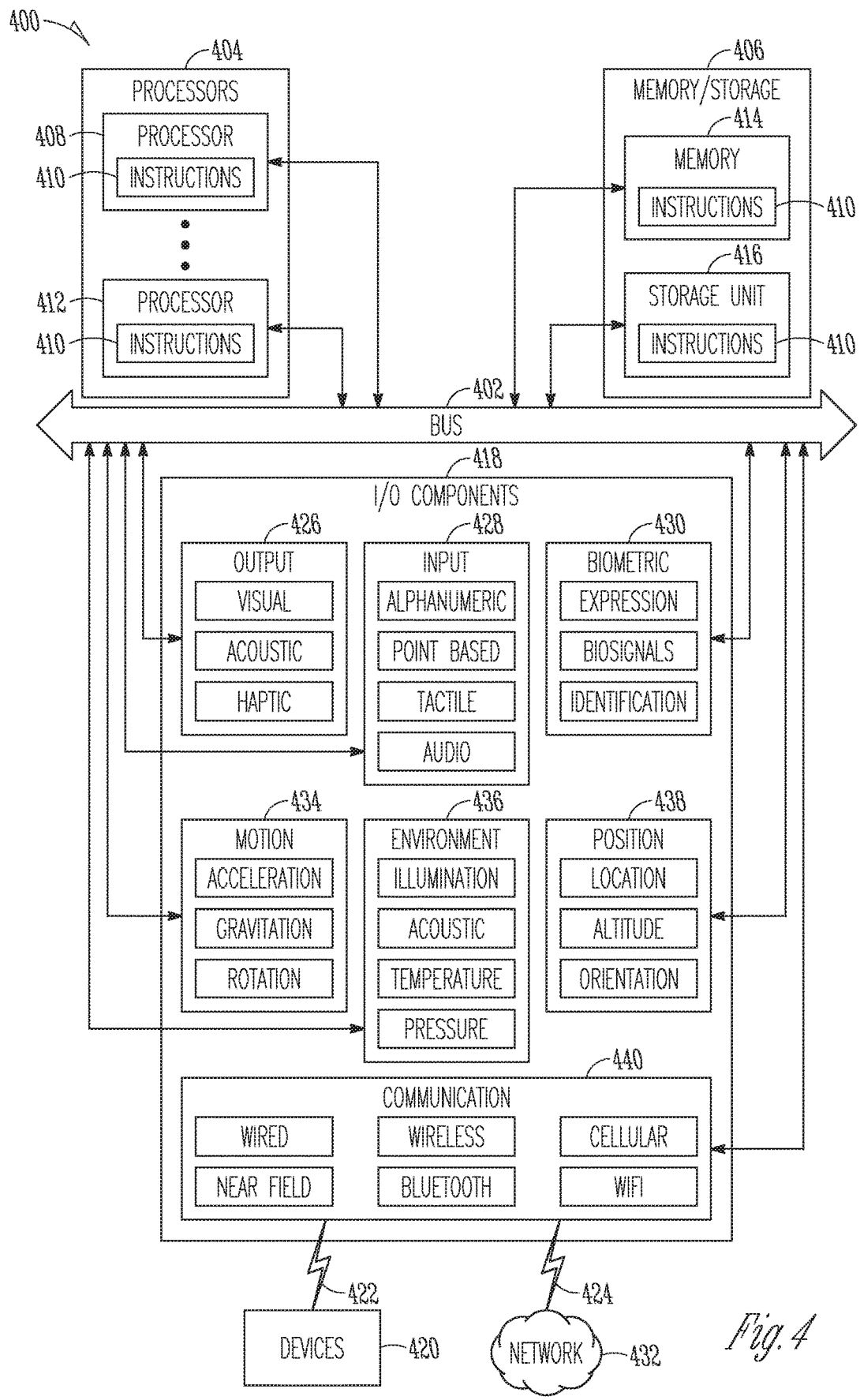
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application 316, an apples, an app, or other executable code) for causing the machine 400 to perform any one or more of the methodologies discussed herein, may be executed. As such, the instructions 410 may be used to implement modules or components described herein. The instructions 410 transform the general, non-programmed machine into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric sensor components 430, motion components 434, environment components 436, or position components 438 among a wide array of other components. For example, the biometric sensor components 430 may include components to detect expressions (e.g., hand expressions, facial expressions, vocal expressions and speech data, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like.

In some examples, biometric identifiers are used. Biometric identifiers are distinctive, measurable characteristics used to label and describe individuals. Biometric identifiers may, in some examples, be categorized as having physiological versus behavioral characteristics. Physiological characteristics are related to the shape of the body. Examples include, but are not limited to a fingerprint, palm veins, facial recognition, DNA data, palm prints, hand geometry, iris recognition, retina, odor or scent, and so forth.

Behavioral characteristics, on the other hand, may be related to the pattern of behavior of a person, including but not limited to typing, a rhythm or cadence in walking, and manner of speaking, for example. A person's speech may include aspects of biometric data, for example, that may serve as a voice print, and/or may include aspects of behavioral data, for example indicating a level of excitement or nervousness. It should also be noted that speaker or voice recognition is the identification of a person derived from characteristics of voices (i.e. voice biometrics) and recognizes who is speaking. Speech recognition, on the other hand, only recognizes what is being said without necessarily identifying the speaker.

Unless the contrary is indicated or specified, in this specification, the term biometric data is intended to cover both physiological and behavioral characteristics. These two terms, however, should nevertheless be understood as relating to different aspects, as described just above.

The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

Referring back to FIG. 2, it will be recalled that in some examples the publication system 106 comprises an interface component 210 and certain other components 206-214 that operate independently or in conjunction with one another to perform methods in accordance with the present disclosure. In some examples, the other components 206-214 include a user device detection component 206, a user identity component 208, a physiological biometric data component 210, a behavioral biometric data component 212, and a marketplace component 214, or combinations thereof.

In some examples, a real-world environment includes a display of physically retrievable items available for purchase. The user device detection component 206 detects the presence of a user device (for example a user device 108, FIG. 1) associated with a user in the real-world environment, and the user identity component 208 stores identity data received from the user device 108. The biometric data components 210-212, either independently or in conjunction with each other, receive sensed biometric data of the user (for example from the biometric sensor components 430, FIG. 4) and based on the received biometric data, identify user interest data for one of the physically retrievable items in the real-world environment.

The marketplace component 214 automatically implements an online offering, without manual operation of the user device 108, relating to the physically retrievable item, based on the interest data identified in the sensed biometric data. In some examples, the user identity component 208 derives a user identification associated with an online account based on the stored identity data received from the user device 108, and the marketplace component 214 provides the online offering for an item corresponding to the physically retrievable item to the online account associated with the user identification.

In some examples, the biometric data components 210-212, independently or in conjunction, identify the interest data based on sensed biometric data derived from a spoken communication of the user, or an interaction by the user with the user device 108, in the real-world environment.

In some examples, the user identity component 208 authenticates the user by comparing a stored voiceprint of the user against a second user identification, the second user identification based on a sensed spoken communication of the user in the real-world environment.

In some examples, the marketplace component 214 validates and completes a purchase transaction for the corresponding item provided in the online offering based on an authentication of the user. In some examples, the user identity component 208 authenticates the user via the user device 408 by comparing the stored identity data against second identity data based on a facial recognition of the user in the real-world environment. The facial recognition operation conducted by the user identity component 208 may be based on physiological biometric data received from one or more biometric sensor components 430, for example.

In other examples, a method for facilitating user engagement in offline transactions comprises listing items for sale, at online prices, in an online publication system (for example, publication system 106, FIG. 2), and providing a real-world environment that includes a display, at offline prices, of physically retrievable items available for immediate purchase and possession. At least some of the physically retrievable items correspond to the items listed for sale in the online publication system 106.

In some examples, the user device detection component 206 detects a proximity or location of a user device (for example, the user device 108, FIG. 1) relative to the real-world environment, and the marketplace component 214 applies a reduction to an offline price of an item based on the detected proximity or location of the user. The applied reduction may, or may not, reduce the offline price to a price at least equal to or lower than the online price for the corresponding online item listed for sale in the online publication system 106. The marketplace component 214 communicates the reduced offline price of the item to the user device 108. Simultaneously, or at a later time, the user device detection component 206 detects the presence of the user device 108 within the real-world environment, and the marketplace component 214 validates and completes a purchase transaction for the item based on an authentication of the user and the communicated reduced price.

In some examples, the marketplace component 214 applies the reduction to the offline price in proportion to the detected proximity or location of the user relative to the real-world environment. If the user is still very far away from the real-world environment, the offline price may be reduced substantially to counter a disincentive of making a long trip in order to purchase the item. In some examples, if a user is very close, the offline price may also be reduced substantially with the aim of consummating a transaction (also known as conversion) while an opportunity to do so is alive. Other proximity-based pricing arrangements for corresponding online and offline items are possible.

In some examples, the user identity component 208 identifies the user by using facial recognition and stores a first user identification based on the facial recognition. In some examples, user identity component 208 identifies a spoken communication by the user and captures speech data based on the identified spoken communication. In some examples, the user identity component 208 extracts from or identifies, in the speech data, data relating to a purchase request for the reduced-price item and forwards the extracted or identified data to the marketplace component 214. The marketplace component 214 and may automatically implement the purchase transaction without manual operation of the user device 108. In some examples, the user is authenticated prior to automatic implementation of the purchase transaction. Here, the user identity component 208 also extracts from or identifies, in the speech data, conversational data unrelated to the purchase request and compares the conversational data against a voiceprint of the user to effect, or at least assist in making, the user authentication. The facial recognition and speech processing operations conducted by the user identity component 208 may be based on physiological biometric data received from one or more biometric sensor components 430, for example.

In some examples, the user identity component 208 extracts from or identifies, in the speech data, an authorization from the user to implement the purchase transaction without manual operation of the user device 108. In some examples, the user identity component 208 recycles the speech data or parts thereof such as the conversational data into a voice recognition component to improve an accuracy of the voiceprint of the user.

Figure 5:
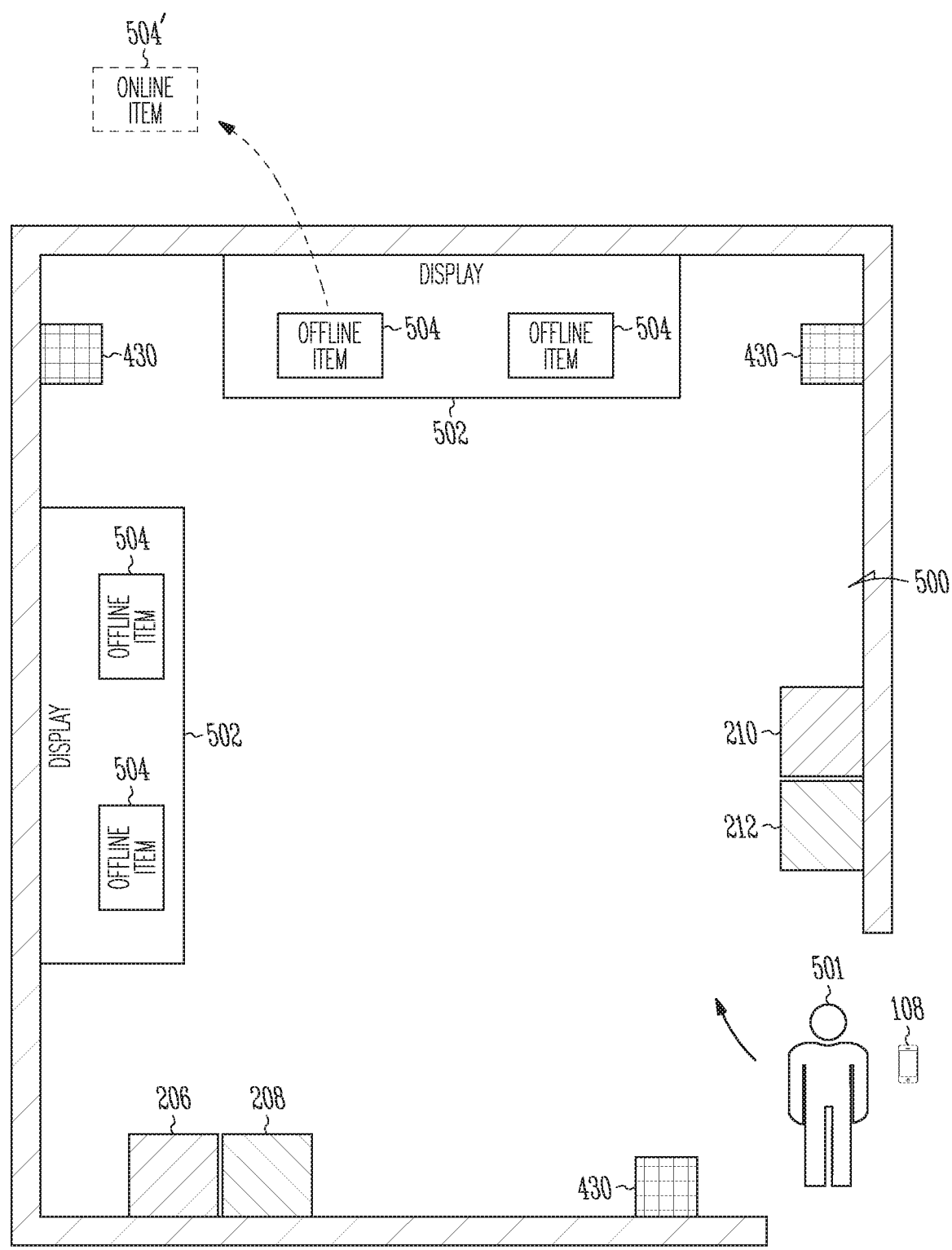
FIG. 5 is a schematic diagram of a real-world environment, according to an example embodiment.

In FIG. 5, a plan view of an example real-world environment 500 is shown. The real-world environment 500 may be defined by a store or booth in a shopping mall, for example, or an item pickup location. Other examples are possible. In some examples, the environment 500 has no check-out counters or store personnel. The environment 500 includes displays 502 of physically retrievable items 504. Other types of displays and purposes therefore are possible. In this example, the items 504 are available for purchase.

A user 501 carrying a user (or client) device 108 enters the environment (for example, a store 500) and a user device detection component 206 detects the presence of the user device 108 therein. A user identity component 208, in communication with the user device detection component 206, stores identity data received from the user device 108.

At appropriate locations within it, the real-world environment 500 includes biometric sensor components 430 that include components to detect user expressions (e.g., hand expressions, facial expressions, vocal expressions and speech data, body gestures, or eye tracking), detect and measure user bio signals (e.g., blood pressure, heart rate, body temperature, perspiration, or brain waves), identify a user 501 (e.g., voice identification, retinal identification, facial identification, fingerprint identification, or electroencephalogram-based identification), and the like.

Also included within the environment 500 are a physiological biometric data component 210, and a behavioral biometric data component 212. The biometric data components 210-212, either independently or in conjunction with each other, receive sensed biometric data of the user 501 from one or more of the biometric sensor components 430 and, based on the received biometric data, identify user interest data for one of the physically retrievable items 504 in the real-world environment 500.

In some examples, the physiological biometric data component 210 is concerned with processing biometric data relating to physiological characteristics related to the shape of the body. Examples include, but are not limited to a fingerprint, palm veins, facial recognition, DNA data, palm prints, hand geometry, iris recognition, retina, odor or scent, and so forth.

In some examples, the behavioral biometric data component 212 is concerned with processing biometric data relating to a pattern of behavior of a person, including but not limited to typing, a rhythm or cadence in walking, and manner of speaking, for example.

The real-world environment 500 also includes a marketplace component 214 that operates in conjunction with the components 206-212 described above. In some examples, the marketplace component 214 automatically implements an online offering, without manual operation of the user device 108, relating to the physically retrievable item 504, based on the interest data identified in the sensed biometric data. In some examples, the user identity component 208 derives a user identification associated with an online account based on the stored identity data received from the user device 108, and the marketplace component 214 provides the online offering for another item corresponding to the physically retrievable item to the online account associated with the user identification.

In some examples, the biometric data components 210-212, independently or in conjunction, identify the interest data based on sensed biometric data derived from a spoken communication of the user 501, or an interaction by the user 501 with the user device 108, in the real-world environment 500. In some examples, the user identity component 208 authenticates the user 501 by comparing a stored voiceprint of the user 501 against a second user identification, the second user identification based on a sensed spoken communication of the user 501 in the real-world environment 500.

In some examples, the marketplace component 214 validates and completes a purchase transaction for the corresponding item provided in the online offering based on an authentication of the user 501. In some examples, the user identity component 208 authenticates the user 501 via the user device 108 by comparing the stored identity data against second identity data based on a facial recognition of the user 501 in the real-world environment 500. The facial recognition operation conducted by the user identity component 208 may be based on physiological biometric data received from one or more biometric sensor components 430, for example.

Again, with reference to FIG. 5, a method for facilitating user engagement in offline transactions comprises listing online items 504' for sale, at online prices, in an online publication system (for example, publication system 106, FIG. 2), and providing a real-world environment 500 that includes a display 502, at offline prices, of physically retrievable (offline) items 504 available for immediate purchase and possession. At least some of the physically retrievable items 504 correspond to the online items 504' listed for sale in the online publication system 106.

In some examples, the user device detection component 206 detects a proximity or location of the user device 108 relative to the real-world environment 500. The proximity may be some inches, feet, or many miles away from the environment 500, for example. The marketplace component 214 applies an adjustment, in this case a reduction, to the offline price of an item 504 based on the detected proximity or location of the user 501. In some examples, the applied reduction may, or may not, reduce the offline price to a price at least equal to or lower than the online price for the corresponding online item 504' listed for sale in the online publication system 106. In some examples, a proximity trigger distance may be set based on an identified price reduction, or a desired degree of incentive for the offline item 504. A price adjustment or degree of incentive may be expressed in absolute terms (for example, fifty dollars off), or a percentage (20% discount), for example.

The marketplace component 214 communicates the reduced offline price of the offline item 504 to the user device 108. Simultaneously, or at a later time, the user device detection component 206 detects the presence of the user device 108 within the real-world environment 500. The marketplace component 214 can automatically implement a transaction for the user 501 without intervention of a store clerk, or without manual operation of the user device 108. Example transactions may include answering a price query, completing a check-out operation, or validating and completing a purchase transaction for the offline item 504 based on an authentication of the user 501 and the previously-communicated reduced offline price.

In some examples, a user 501 can enter the real-world environment 500 (for example, a store) with the intent to collect an item 504 corresponding to an online item 504' previously purchased online, or for which a purchase request or hold instruction was submitted. In an alternative example, the user 501 purchases or submits a purchase request for the actual item 504 in the real-world environment 500 while there using, for example, a payment application on his or her user device 108. In either example, the user identity component 208 identifies the user 501 in the environment 500 using facial recognition and stores a first user identification based on the facial recognition. At the same time, or slightly thereafter, one or both biometric data components 210-212 identifies a spoken communication uttered by the user 501 and captures speech data based on the identified spoken communication. The biometric data components 210-212 then extract from or identify, in the speech data, data relating to the purchase, purchase request, or hold instruction of the item 504. The extracted or identified data is sent to the marketplace component 214 for further processing. Based on this received data, the marketplace component 214 automatically implements or completes a purchase transaction without requiring manual operation of the user device 108, or the assistance of a store clerk, for example.

The biometric data components 210-212 also extract from or identify, in the speech data, conversational data unrelated to the prior purchase, purchase request, or hold instruction and compare the conversational data against a voiceprint of the user 501 to assist in user authentication, or validation of a payment instruction or purchase transaction, for example if two-factor authentication is desired.

Figure 6:
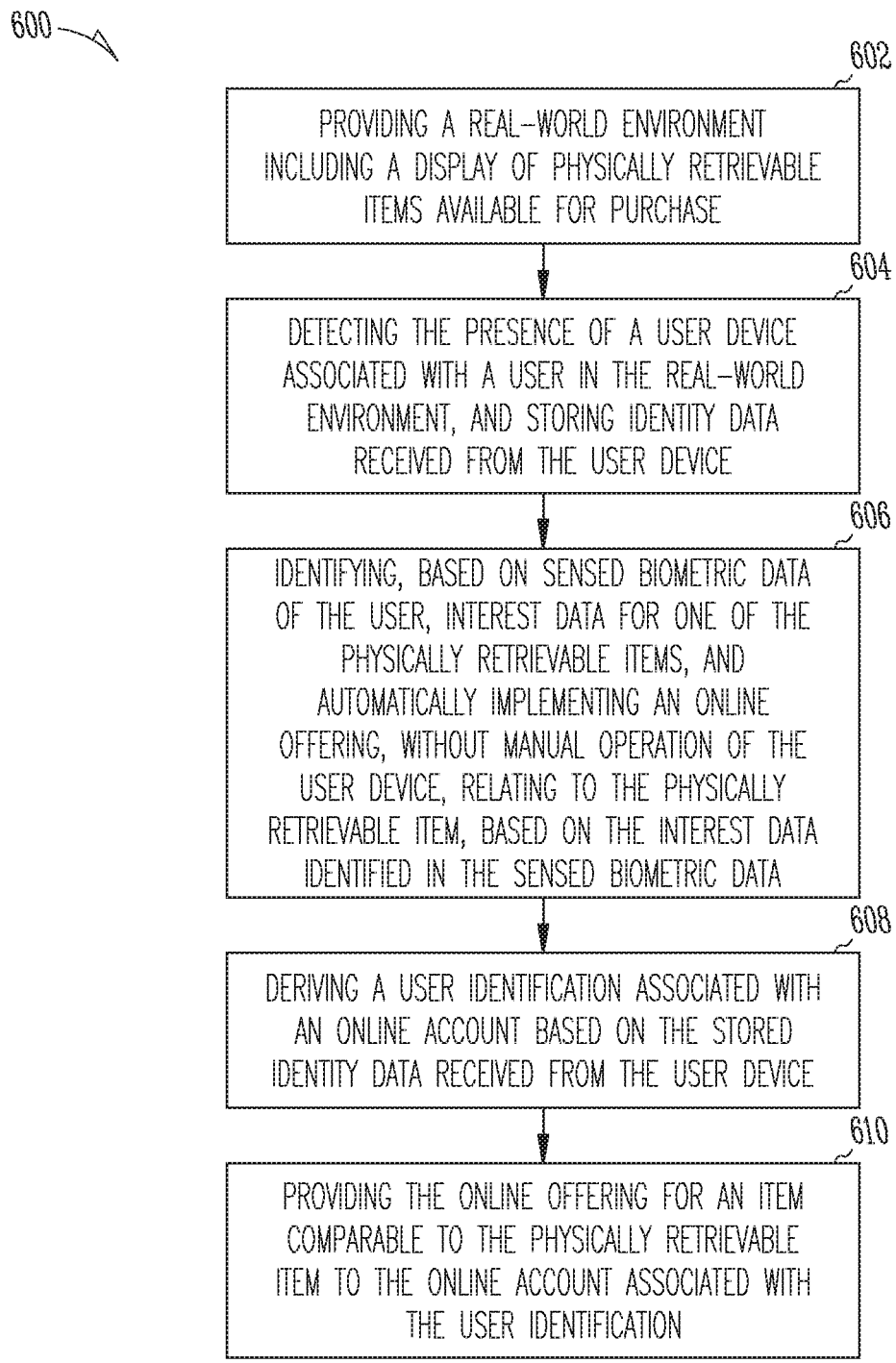
FIG. 6 is a flow chart of operations in a method, according to an example embodiment.

The present disclosure also includes example methods. In one example, and with reference to FIG. 6, a method 600 includes operations such as, at 602, providing a real-world environment 500 including a display 502 of physically retrievable items available for purchase; at 604, detecting the presence of a user device 108 associated with a user 501 in the real-world environment, and storing identity data received from the user device 108; at 606, identifying, based on sensed biometric data of the user 501, interest data for one of the physically retrievable items 504, and automatically implementing an online offering, without manual operation of the user device 108, relating to the physically retrievable item 504, based on the interest data identified in the sensed biometric data; at 608, deriving a user identification associated with an online account based on the stored identity data received from the user device 108; and, at 610, providing the online offering for an item 504' comparable to the physically retrievable item 504 to the online account associated with the user identification.

Figure 7:
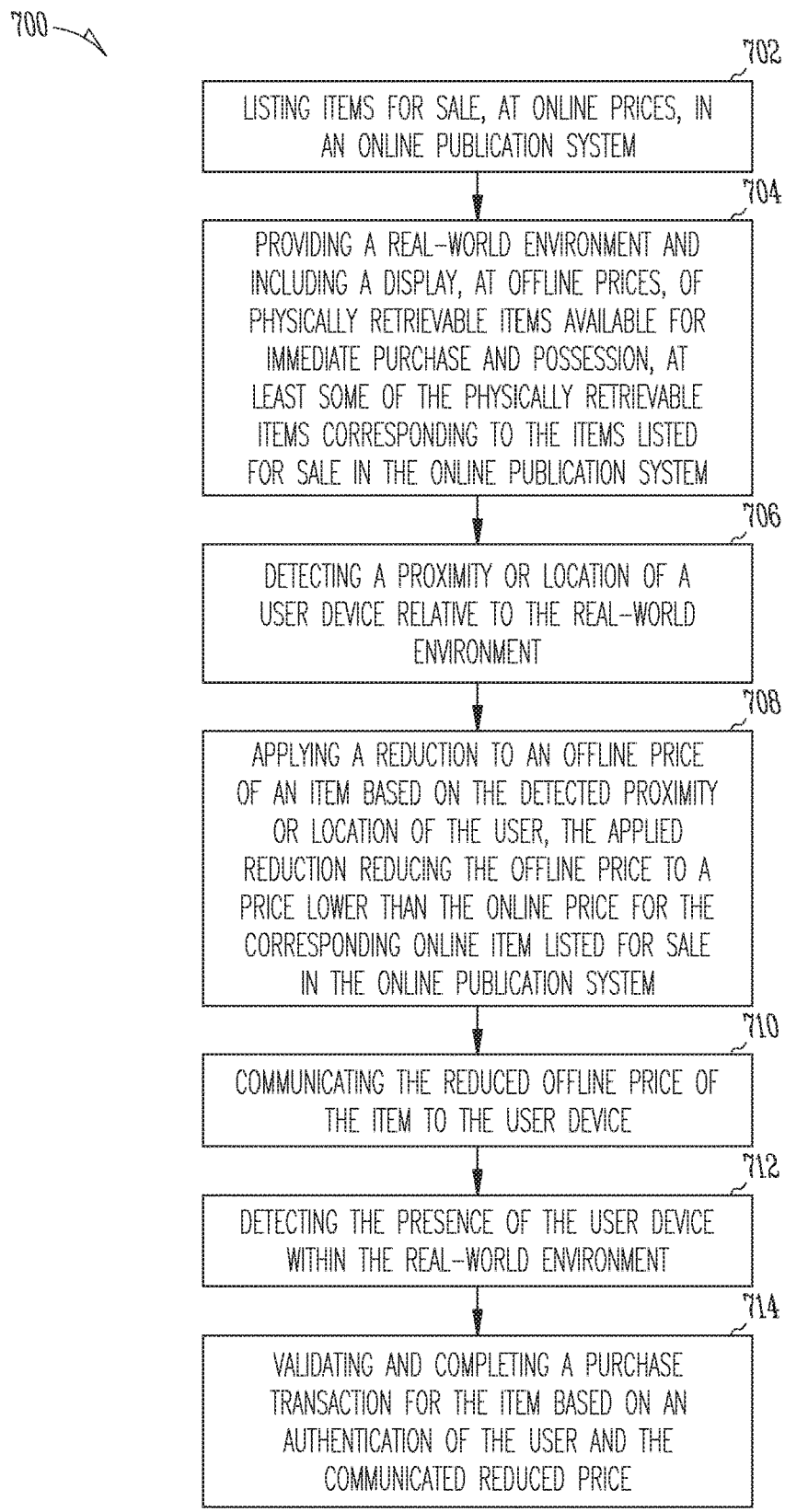
FIG. 7 is a flow chart of operations in a method, according to an example embodiment.

In one example, and with reference to FIG. 7, a method 700 includes operations such as, at 702, listing items 504' for sale, at online prices, in an online publication system 106; at 704, providing a real-world environment 500 and including a display 502, at offline prices, of physically retrievable items 504 available for immediate purchase and possession, at least some of the physically retrievable items 504 corresponding to the items 504' listed for sale in the online publication system 106; at 706, detecting a proximity or location of a user device 108 relative to the real-world environment 500; at 708, applying a reduction to an offline price of an item 504 based on the detected proximity or location of the user 501, the applied reduction reducing the offline price to a price lower than the online price for the corresponding online item 504' listed for sale in the online publication system 106; at 710, communicating the reduced offline price of the item 504 to the user device 108; at 712, detecting the presence of the user device 108 within the real-world environment 500; and, at 714, validating and completing a purchase transaction for the item 504 based on an authentication of the user 501 and the communicated reduced price.

In some examples, a non-transitory machine-readable medium includes instructions 410 that, when read by a machine 400, cause the machine 400 to perform operations comprising at least the non-limiting example operations described herein.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting a presence of a user device associated with a user in a real-world environment that includes a display of physically retrievable items available for purchase;
   sensing biometric data of the user by one or more biometric sensors, the sensed biometric data comprising at least a first type of characteristic data and a second type of characteristic data, wherein:
   the first type of characteristic data comprises one or more of expression data, bio signals, or behavioral data; and
   the second type of characteristic data comprises data usable as one or more biometric identifiers, the data usable as one or more biometric identifiers being distinctive data descriptive of a particular user;
   receiving, by a first biometric data component and a second biometric component, the sensed biometric data, wherein the first biometric data component receives the first type of characteristic data and the second biometric data component receives the second type of characteristic data;
   detecting, based on either the first type of characteristic data or the second type of characteristic data, an interest relative to one of the physically retrievable items;

automatically selecting an online offering, without manual operation of the user device, relating to the physically retrievable item, based on the detected interest;

deriving a user identification associated with an online account based on the second type of characteristic data sensed by the one or more biometric sensors;

providing, at the user device, the online offering related to the physically retrievable item to the online account associated with the user identification at the user device; and performing, by a marketplace component in communication with the first biometric data component and the second biometric data component, a purchase transaction based on the online offering, wherein performing the purchase transaction comprises authenticating the user based upon a comparison of the second type of characteristic data to stored identity information of the user.

2. The method of claim 1, further comprising identifying the interest data based on the sensed biometric data derived from a spoken communication of the user, or an interaction by the user with the user device, in the real-world environment.

3. The method of claim 1, wherein the second type of characteristic data is a sensed spoken communication of the user and the method further comprises authenticating the user by comparing a stored voiceprint of the user against the sensed spoken communication of the user.

4. The method of claim 1, wherein the second type of characteristic data is a facial recognition of the user and the method further comprises authenticating the user by comparing the stored identity information against second identity data based on the facial recognition of the user.

5. A system comprising:
at least one processor; and
a memory storing instructions that, when executed by the at least one processor, cause a classification system to perform operations comprising:
  detecting a presence of a user device associated with a user in a real-world environment that includes a display of physically retrievable items available for purchase;
  sensing biometric data of the user by one or more biometric sensors, the sensed biometric data comprising at least a first type of characteristic data and a second type of characteristic data, wherein:
    the first type of characteristic data comprises one or more of expression data bio signals. or behavioral data; and
    the second type of characteristic data comprises data usable as one or more biometric identifiers, the data usable as one or more biometric identifiers being distinctive data descriptive of a particular user;
  receiving, by a first biometric data component and a second biometric component, the sensed biometric data, wherein the first biometric data component receives the first type of characteristic data and the second biometric data component receives the second type of characteristic data;
  detecting, based on either the first type of characteristic data or the second type of characteristic data, an interest relative to one of the physically retrievable items;

automatically selecting an online offering, without manual operation of the user device, relating to the physically retrievable item, based on the detected interest;

deriving a user identification associated with an online account based on the second type of characteristic data sensed by the one or more biometric sensors;

providing, at the user device, the online offering related to the physically retrievable item to the online account associated with the user identification at the user device; and performing, by a marketplace component in communication with the first biometric data component and the second biometric data component, a purchase transaction based on the online offering, wherein performing the purchase transaction comprises authenticating the user based upon a comparison of the second type of characteristic data to stored identity information of the user.

6. The system of claim 5, wherein the operations further comprise identifying the interest data based on the sensed biometric data derived from a spoken communication of the user, or an interaction by the user with the user device, in the real-world environment.

7. The system of claim 5, wherein the second type of characteristic data is a sensed spoken communication of the user and the operations further comprise authenticating the user by comparing a stored voiceprint of the user against the sensed spoken communication of the user.

8. The system of claim 5, wherein the second type of characteristic data is a facial recognition of the user and the operations further comprise authenticating the user by comparing the stored identity information against second identity data based on the facial recognition of the user.

9. A machine-readable medium containing instructions which, when read by a machine, cause the machine to perform operations comprising:
  detecting a presence of a user device associated with a user in the real-world environment that includes a display of physically retrievable items available for purchase;
  sensing biometric data of the user by one or more biometric sensors, the sensed biometric data comprising at least a first type of characteristic data and a second type of characteristic data, wherein:
    the first type of characteristic data comprises one or more of expression data, bio signals, or behavioral data; and
    the second type of characteristic data comprises data usable as one or more biometric identifiers, the data usable as one or more biometric identifiers being distinctive data descriptive of a particular user;
  receiving, by a first biometric data component and a second biometric component, the sensed biometric data, wherein the first biometric data component receives the first type of characteristic data and the second biometric data component receives the second type of characteristic data;
  detecting, based on either the first type of characteristic data or the second type of characteristic data, an interest relative to one of the physically retrievable items, and automatically selecting an online offering, without manual operation of the user device, relating to the physically retrievable item, based on detected the interest;

deriving a user identification associated with an online account based on the second type of characteristic data. sensed by the one or more biometric sensors;

providing, at the user device, the online offering related to the physically retrievable item to the online account associated with the user identification; and performing. by a marketplace component in communication with the first biometric data component and the second biometric data component, a purchase transaction based on the online offering, wherein performing the purchase transaction comprises authenticating the user based upon a comparison of the second type of characteristic data to stored identity information of the user.

10. The medium of claim 9, wherein the operations further comprise identifying the interest data based on the sensed biometric data derived from a spoken communication of the user, or an interaction by the user with the user device, in the real-world environment.

11. The medium of claim 9, wherein the second type of characteristic data is a sensed spoken communication of the user and the operations further comprise authenticating the user by comparing a stored voiceprint of the user against the sensed spoken communication of the user.

12. The medium of claim 9, wherein the second type of characteristic data is a facial recognition of the user and the operations further comprise authenticating the user by comparing the stored identity information against second identity data based on the facial recognition of the user.

* * * * *